Patented June 9, 1936

2,043,284

UNITED STATES PATENT OFFICE 2,043,284

PRODUCTION OF CHLORINE DIOXIDE

George Lewis Cunningham and Bernard John Losch, Niagara Falls, N. Y., assignors to The Mathieson Alkali Works, Inc., New York, N. Y., a corporation of Virginia No Drawing. Application November 8, 1934, Serial No. 752,124

4 Claims. (Cl. 23—152)

Our invention relates to improvements in the production of chlorine dioxide and in the elimination of chlorine from gas mixtures comprising chlorine and chlorine dioxide.

We have discovered that chlorine reacts with aqueous solutions of water soluble chlorites to liberate chlorine dioxide with formation of the corresponding chloride. When the reaction is effected in substantially neutral solution, two mols of chlorine dioxide are evolved per mol. of chlorine absorbed. When the reaction is so effected, it is possible to obtain substantially quantitative yields of chlorine dioxide substantially free from chlorine. We do not know the exact course of the reaction, but the overall reaction may be indicated as follows:

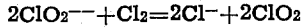

Chlorite+chlorine=chloride+chlorine dioxide. For example, at ordinary temperature, gaseous chlorine reacts with sodium chlorite in aqueous solution to liberate chlorine dioxide with formation of sodium chloride. The overall reaction may be indicated as follows:

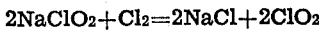

The chlorites of the alkali metals and the chlorites of the alkaline earth metals react in the same manner. It is to be noted that formation of chlorate is not involved.

Applying our invention for the production of chlorine dioxide, we react chlorine with an aqueous solution of an appropriate chlorite. To minimize the hazard of handling gaseous chlorine dioxide in high concentration, we prefer to supply the chlorine to the reaction sufficiently diluted with an inert gaseous diluent such as nitrogen or air to produce chlorine dioxide correspondingly diluted with that diluent to keep the concentration of chlorine dioxide within safe limits. If the chlorine is supplied to the reaction undiluted, substantially undiluted chlorine dioxide is produced. The following example will illustrate this application of our invention:

*Example I.*—Gaseous chlorine or a gas mixture comprising chlorine and an inert gaseous diluent is passed through a solution of 90 parts (by weight) of sodium chlorite, $NaClO_2$, in 200 parts of water at a temperature of 20°–25° C. until 35.5 parts of chlorine have been absorbed. 67.46 parts of gaseous chlorine dioxide are evolved.

Applying our invention for the elimination of chlorine from gas mixtures comprising chlorine and chlorine dioxide, we pass the gas mixture containing chlorine through an aqueous solution of an appropriate chlorite. By the same reaction, the chlorine component of the gas mixture is converted to chlorine dioxide. Each mol. of chlorine so converted thus becomes two mols of chlorine dioxide in the effluent gas mixture with consumption of two mols of an alkali metal chlorite or of one mol. of an alkaline earth chlorite, for example. Chlorine dioxide or gas mixtures of chlorine dioxide substantially free from chlorine can thus be produced from gas mixtures of chlorine and chlorine dioxide such as are produced by reaction between mineral acids and chlorates for example. The following example will illustrate this application of our invention:

*Example II.*—A gas mixture comprising an inert gas, chlorine and chlorine dioxide in molal ratio of 1:1 and containing 35.5 parts of chlorine is passed through a solution of 90 parts of sodium chlorite in 200 parts of water at a temperature of 20°–25° C. until the chlorine is absorbed. The gas mixture will then contain 135 parts of chlorine dioxide.

Our invention is also of special value in conjunction with bleaching operations involving the use of chlorine dioxide, as in the bleaching of flour for example, in that it provides for convenient and economical production of chlorine dioxide or gas mixtures of chlorine dioxide of high purity, particularly with respect to chlorine.

We claim:

1. The production of chlorine dioxide by reaction between chlorine and an aqueous solution of a water soluble chlorite.

2. The production of chlorine dioxide by reaction between chlorine and an aqueous solution of a chlorite of the class consisting of the chlorites of the alkali metals and the alkaline earth metals.

3. The purification of chlorine dioxide with respect to chlorine by reaction between the impure gas and an aqueous solution of a water soluble chlorite.

4. The purification of chlorine dioxide with respect to chlorine by reaction between the impure gas and an aqueous solution of a chlorite of the class consisting of the chlorites of the alkali metals and the alkaline earth metals.

GEORGE LEWIS CUNNINGHAM.
BERNARD JOHN LOSCH.